United States Patent
Kelly et al.

(10) Patent No.: US 7,283,534 B1
(45) Date of Patent: Oct. 16, 2007

(54) NETWORK WITH VIRTUAL "VIRTUAL PRIVATE NETWORK" SERVER

(75) Inventors: Scott G. Kelly, Fremont, CA (US); Robert Tashjian, Fremont, CA (US)

(73) Assignee: Airespace, Inc., San Jose, CA (US)

( * ) Notice: Subject to any disclaimer, the term of this patent is extended or adjusted under 35 U.S.C. 154(b) by 1068 days.

(21) Appl. No.: 10/302,508

(22) Filed: Nov. 22, 2002

(51) Int. Cl.
*H04L 12/56* (2006.01)

(52) U.S. Cl. ............... 370/395.54; 370/351; 370/400; 370/409

(58) Field of Classification Search ............... 370/351, 370/395.54, 395.5, 400, 401, 409, 352, 386, 370/389, 392, 431; 709/203, 223, 226–228, 709/230, 237, 245, 250
See application file for complete search history.

(56) References Cited

U.S. PATENT DOCUMENTS

| | | | | |
|---|---|---|---|---|
| 5,621,727 A | * | 4/1997 | Vaudreuil | 370/401 |
| 5,920,699 A | * | 7/1999 | Bare | 709/225 |
| 6,304,912 B1 | * | 10/2001 | Oguchi et al. | 709/238 |
| 6,754,220 B1 | * | 6/2004 | Lamberton et al. | 370/401 |
| 6,772,226 B1 | * | 8/2004 | Bommareddy et al. | 709/245 |
| 6,823,462 B1 | * | 11/2004 | Cheng et al. | 726/15 |
| 6,934,292 B1 | * | 8/2005 | Ammitzboell | 370/400 |
| 6,944,785 B2 | * | 9/2005 | Gadir et al. | 714/4 |
| 6,993,026 B1 | * | 1/2006 | Baum et al. | 370/392 |
| 7,036,143 B1 | * | 4/2006 | Leung et al. | 726/15 |
| 7,088,689 B2 | * | 8/2006 | Lee et al. | 370/282 |
| 7,107,614 B1 | * | 9/2006 | Boden et al. | 726/15 |
| 7,110,375 B2 | * | 9/2006 | Khalil et al. | 370/331 |
| RE39,317 E | * | 10/2006 | Sakagawa | 370/395.54 |
| 7,154,889 B1 | * | 12/2006 | Rekhter et al. | 370/392 |

* cited by examiner

*Primary Examiner*—Seema S. Rao
*Assistant Examiner*—Mark A. Mais
(74) *Attorney, Agent, or Firm*—Mark J. Spolyar

(57) ABSTRACT

A distributed network is provided with mobile user devices, a virtual "Virtual Private Network" (VPN) server, and a plurality of physical VPN servers, wherein the virtual VPN server allows all mobile user devices to be configured with a single VPN server address, namely that of the virtual VPN server. The plurality of physical VPM servers all recognize and intercept network traffic sent to the virtual VPN server address, so that traffic can be distributed throughout the network. Specifically, each real VPN server responds to network traffic sent by a mobile user device to the address of the virtual VPN server and communicates with the mobile user device using the virtual VPN server address in preference to the individually assigned address of the real VPN server.

8 Claims, 5 Drawing Sheets

NETWORK WITH VIRTUAL "VIRTUAL PRIVATE NETWORK" SERVER

BACKGROUND OF THE INVENTION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

This invention relates to communication protocols, and more specifically to secure communication protocols in a distributed network where users of the network attach to the network at various locations over time.

A Virtual Private Network (VPN) is a known communication application that typically operates at Layer 3 and above (3-7) of the ISO Internet model. This mechanism is used to provide secure communication among clients that have established connection to a VPN server, a physical element in such a network. Specifically, a VPN server provides both authentication of and privacy for communications between the VPN server and a user device. A typical application of a VPN server is to secure the communications between user devices that are outside a company's facilities and the company's network over the public internet or dial-up connections. A typical VPN server, after authenticating the communications from the user devices and removing any encryption applied to protect the privacy of those communications, forwards the communications onto the company's internal network, providing reasonable assurance of secure communications.

It has not previously been recognized that the use of a Virtual Private Network (VPN) paradigm can be a substantial problem in a distributed network with mobile users, when a conventional VPN server is employed.

A conventional VPN server, like other devices on a network, requires an address in order for it to be found by user devices and for its services to be utilized by these user devices. In known networks, an address, specifically an Internet Protocol (IP) address, fixes the location of the device having the address to a specific network segment, which is a small subset of a larger distributed network. Whenever a user device is stationary and remains attached to the network at a single location, the address of its associated VPN server can be statically configured in the user device to meet one or more of several network design criteria, including load balancing on multiple VPN servers, network segment minimization so that user device traffic traverses the optimum path to reach the configured VPN server, and total bandwidth minimization relating to bandwidth consumed by the user device's VPN traffic. However, when a user device is mobile in the network and can attach to the network from a variety of locations at different times, a statically configured VPN server address cannot meet the network design criteria, since the choice of VPN server address to meet the network design criteria is highly dependent on the location at which the user device attaches to the network.

An extreme example of the problem is a company with offices in New York and San Francisco. Referring to FIG. 1, in this example, the company must have two VPN servers, one server 12 in New York, and one server 14 in San Francisco. User devices 16, 18, 20 on the West Coast would typically be configured with the address of the San Francisco VPN server 12, while user devices 22, 24, 26 on the East Coast would typically be configured with the address of the New York VPN server 14. When a West Coast user device 16 sends a message to an East Coast user device 22, the message travels from the West Coast user device 16 to the San Francisco VPN server 12, through the Internet cloud 28 or over a private secure network of the company on to the New York VPN server 14, and finally from the New York VPN server 14 to the East Coast user device 22. If the East Coast and West Coast user devices 16 and 22 were both brought to the opposite coasts and were to send the same message, the message would start on the East Coast as a West Coast user device, cross the continent via the Internet cloud to reach the San Francisco VPN server 12 (since this is the address that is statically configured in the West Cost user device 16), traverse the continent a second time (for example on the company's secure network) to reach the New York VPN server 14, and finally cross the continent a third time via the Internet cloud to be delivered to the East Coast user device 22 that is now on the West Coast (again because the address of the New York VPN server 14 is statically configured in the East Coast user device). Thus, a message that could have been delivered between the East Coast and West Coast user devices by crossing the continent only once, actually traverses the continent three times to accomplish the task, tripling the number of network segments used, the network bandwidth consumed, and the latency or delay in message delivery.

One obvious and known solution to this problem is to provide for manual or automatic reconfiguration of the user devices to locate the closest VPN server of its virtual network. However, the user must know of all such VPN servers and their relative locations. An automatic protocol would need to know the same information and have the capability of minimizing the metrics that contribute to less than optimum network utilization. Expecting a user typically unfamiliar with the metrics related to network utilization to manually perform these operations is not reasonable. Network connectivity for example is not necessarily related to physical distance. For a protocol to perform these tasks automatically, it would be necessary to test each connectivity path, to determine optimized metrics, which creates undesired extra traffic on the network. Moreover, it would be difficult to distinguish such beacon traffic from hostile probe traffic and therefore may not be responded to favorably by the VPN server. Heretofore, VPN service providers are not aware of these problems, since they seldom have more than a single VPN server. By the time their services are distributed, the problem is exacerbated by excessive network traffic that masks this problem.

What is needed is a solution that adapts to the mobility of the user devices without requiring that user devices be reconfigured to find the closest VPN server.

SUMMARY OF THE INVENTION

According to the invention, a distributed network is provided with mobile user devices, a virtual "Virtual Private Network" (VPN) server, and a plurality of physical VPN servers, wherein the virtual VPN server allows all mobile user devices to be configured with a single VPN server address, namely that of the virtual VPN server. The plurality of physical VPN servers all recognize and intercept network traffic sent to the virtual VPN server address, so that traffic can be distributed throughout the network. Specifically, each real VPN server responds to network traffic sent by a mobile user device to the address of the virtual VPN server and communicates with the mobile user device using the virtual VPN server address in preference to the individually assigned address of the real VPN server.

The use of a fixed virtual VPN server as a substitute for fixed physical VPN servers has several advantages. The virtual VPN server eliminates the need for any reconfiguration of mobile user devices based on geographic location. It also allows protocols to be adopted that minimize control and management traffic having to do with VPN network services.

The invention will be better understood by reference to the following detailed description in connection with the accompanying drawings.

DESCRIPTION OF SPECIFIC EMBODIMENTS
OF THE INVENTION

Figure 1:
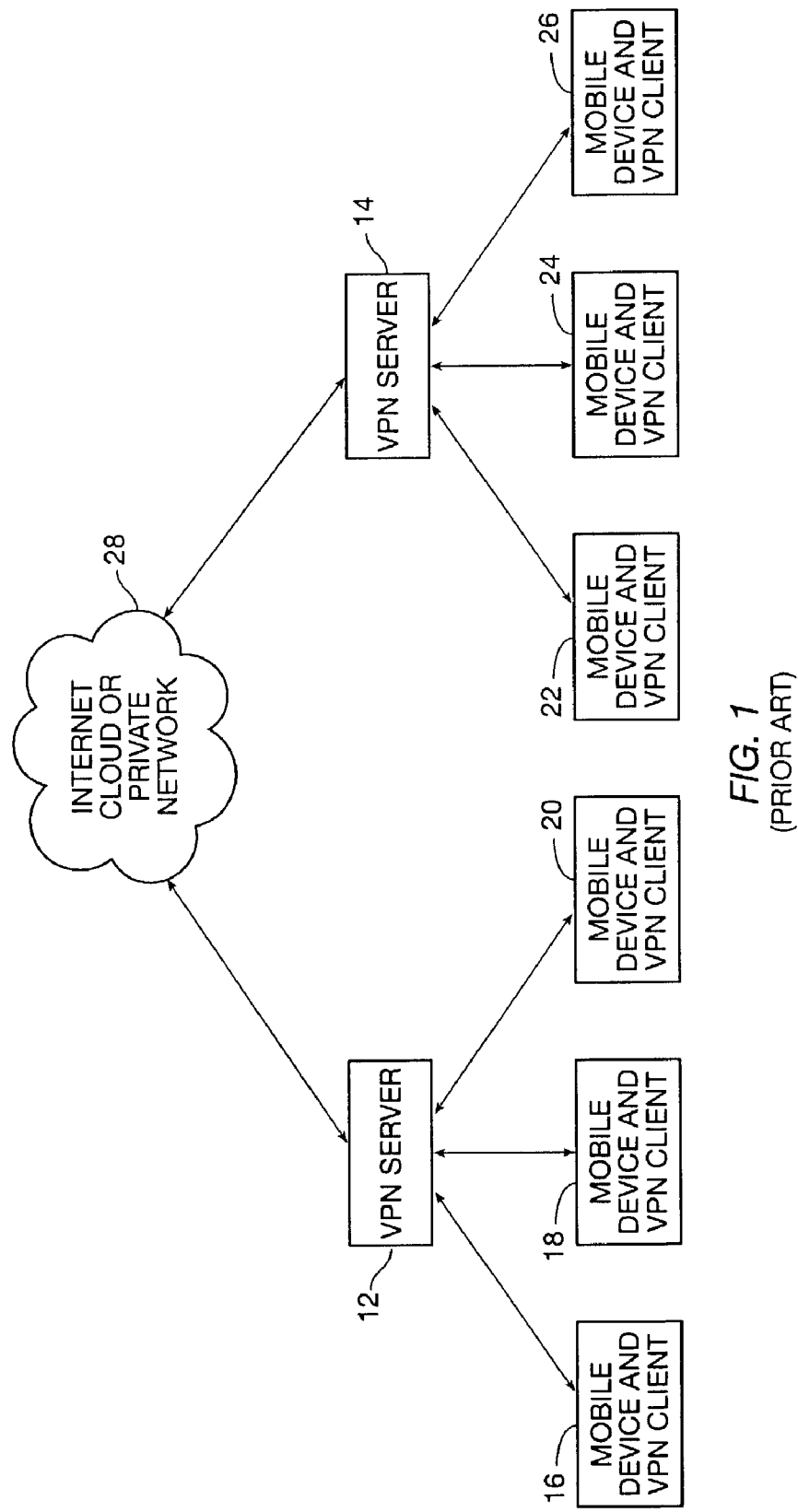
FIG. 1 is a block diagram showing a conventional (prior art) network having mobile devices communicating with a plurality of physical VPN servers.
Figure 2:
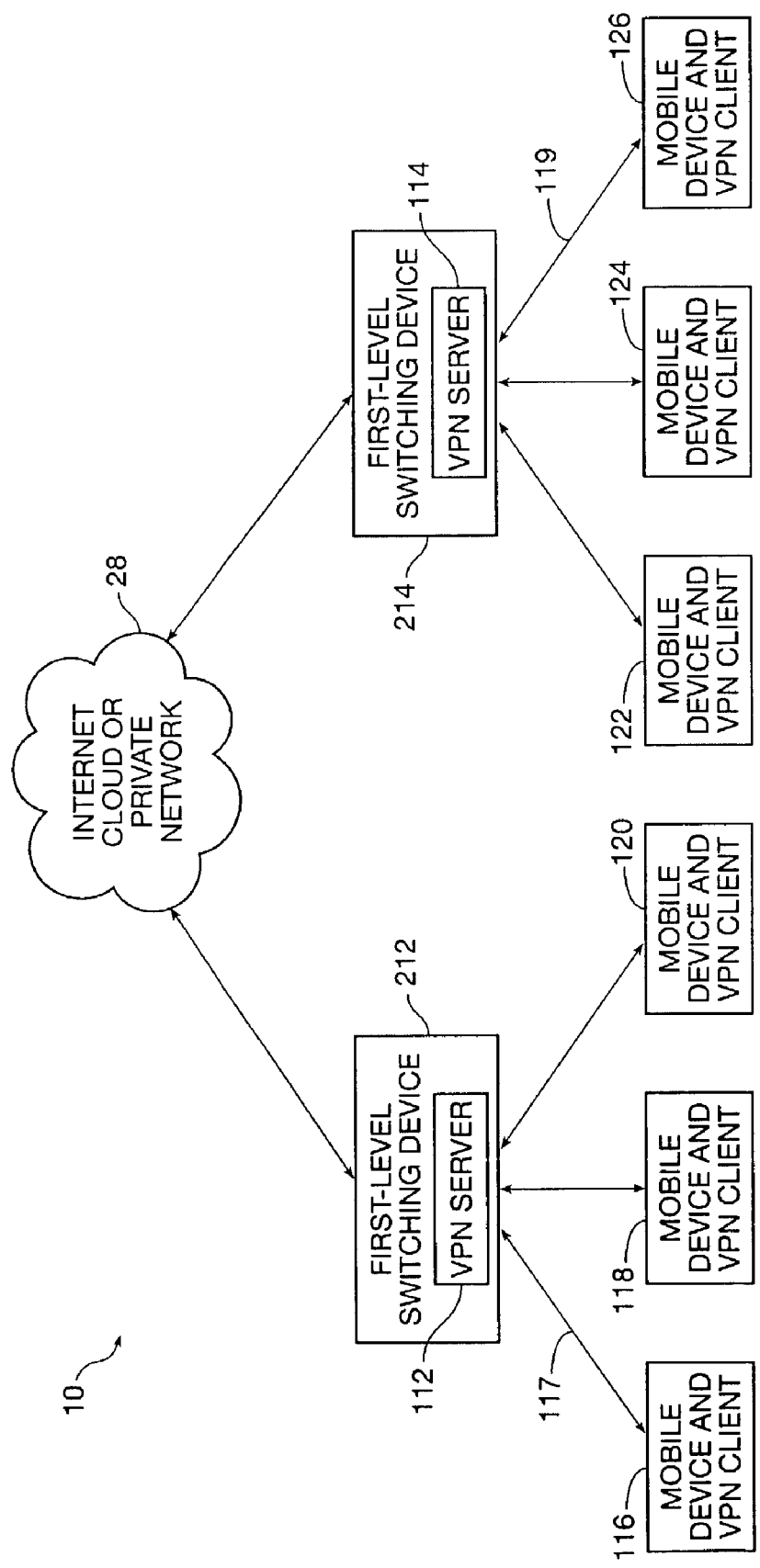
FIG. 2 is a block diagram showing a network according to the invention having mobile devices communicating with a plurality of physical VPN servers, each configured with the same virtual VPN server address, wherein the physical VPN servers are at or near the edge of the network.

Referring to FIG. 2, in a virtual private network (VPN) 10, a mobile device 116 communicates with an access network 117 using ISO layer 2 and ISO layer 3 networking protocols that include addressing information that informs routing, bridging, and switching devices (not shown) in the network how the communication from the mobile device 116 is to be routed to its intended destination, such as a second mobile device 126. Physical VPN servers 112 and 114 are placed at or near the edge of the network 10, within the first-level switching devices 212, 214. This physical placement at or near the network edge (i.e., the last link to the user device) helps to minimize the network resources that are consumed by communications secured by the VPN protocol between the mobile devices and the VPN server. (VPN servers are considered to be at the edge of the network if only layer 3 layer 2 addressing is required to allow a mobile device to communicate with the VPN server.) Each of the VPN servers 112, 114 in a first-level switching device is assigned the same network layer (layer 3) address, which according to the invention is the network layer address of the virtual VPN server. Further according to the invention, every mobile device is configured to communicate with their nearest physical VPN server via the address of a virtual VPN server, which cannot be shown in the figure because its of its virtual nature. It is of course possible to have a plurality of virtual VPN servers. Each of the virtual VPN servers in a first-level switching device is also assigned a layer 2 address that is unique to each switching device. As will be clear hereafter, this seeming violation of protocol is in fact possible and allows for a seemingly intractable problem to be solved.

In the network of FIG. 2, the mobile devices 116, 118, 120, 122, 124, 126 directly connect to physical VPN services but resolve the network address of the virtual VPN server to a globally unique ISO layer 2 address. This allows specific mobile devices to communicate directly with the virtual VPN services using the unique layer 2 address of the physical VPN server 112 or 114 (but not both) that is physically located in the first-level switching device 212 or 214. A mobile device accomplishes this address resolution by merely using any conventional network communication protocol that includes a feature specifically to effect address resolution. An example of one of these protocols is the Address Resolution Protocol (ARP), defined by the Internet Engineering Task Force (IETF) Request for Comments (RFC) 826, which is well known in the art. Once a specific mobile device has resolved the layer 3 address of the virtual VPN server to a unique layer 2 address of the attached physical VPN server, the mobile device uses this layer 2 address to communicate with the virtual VPN server. The following is a description of a flow chart illustrating this address resolution procedure incorporating the inventive features.

Figure 4:
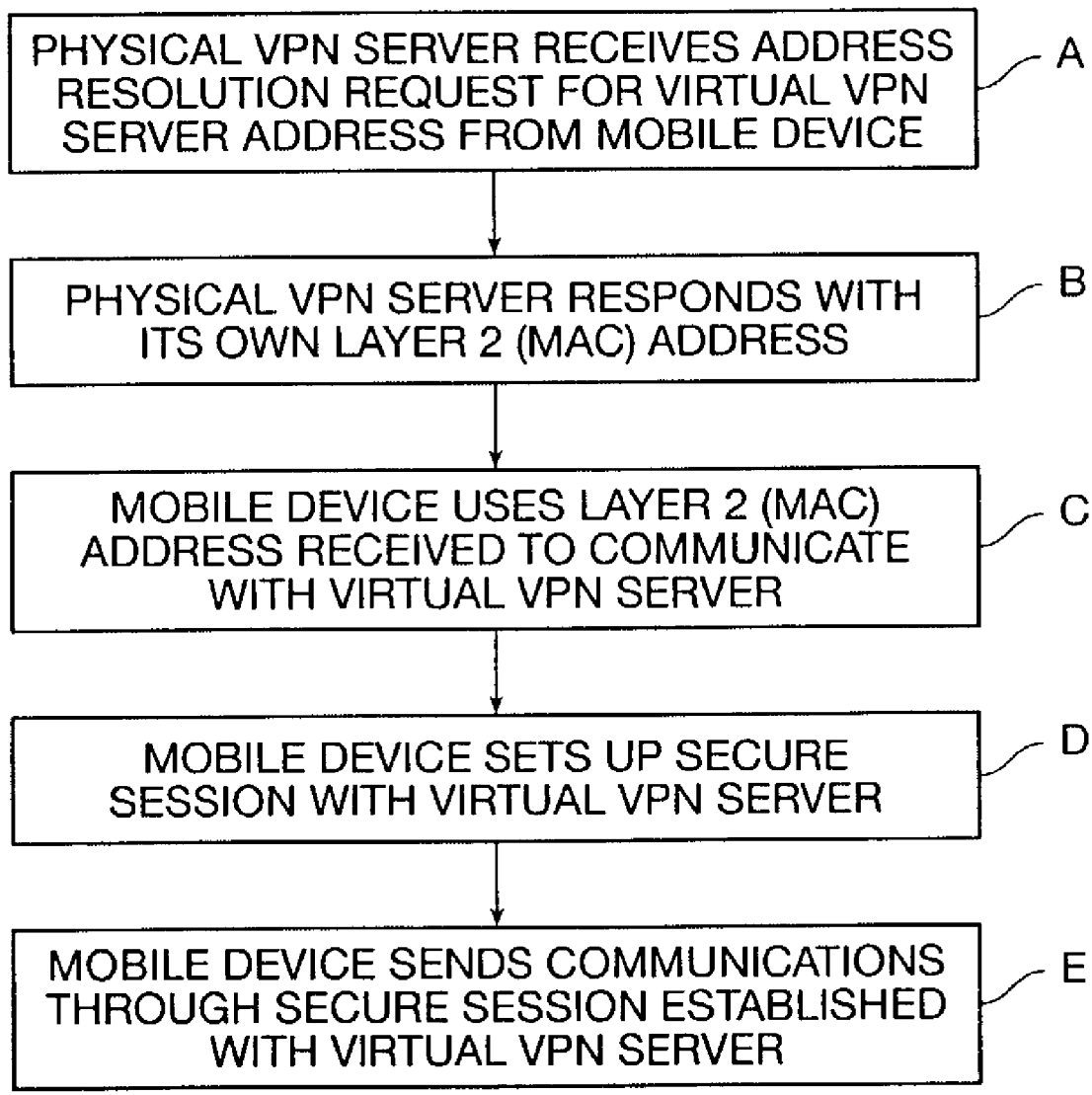
FIGS. 4 and 5 are flow charts illustrating operation of the virtual VPN system according to particular implementations of the invention.

Referring to FIG. 4, in the network of FIG. 2, the physical VPN server 112 acting as a virtual VPN server in the first-layer switching device 212 first receives and then responds to all configured protocols where the virtual VPN server layer 3 address is the intended destination of the protocol communication. In particular, when a request to resolve the virtual VPN server layer 3 address is received (STEP A) from connected mobile device 116, 118, or 120, the virtual VPN service of the physical VPN server 112 having the connection responds to the request to resolve layer 3 addresses to layer 2 addresses by sending to the mobile device 116, 118, or 120 the unique layer 2 address of the switching device 212 (STEP B). (The virtual VPN server response to address resolution requests for the virtual VPN server layer 3 address is in addition to any other responses that it may provide to requests for other layer 3 addresses that may be configured on the first-layer switching device. Those actions are outside the scope and are not directly relevant to the present invention.) The mobile device 116, 118 or 120 communicates further with the virtual VPN service of the physical VPN server 112 using the layer 2 address received in response to the address resolution request (STEP C) to establish a secure communication session with the virtual VPN service (STEP D). After establishment of the secure communication session with the virtual VPN service, the mobile device sends its communications to the virtual VPN service using the secure communication session (STEP E).

Figure 3:
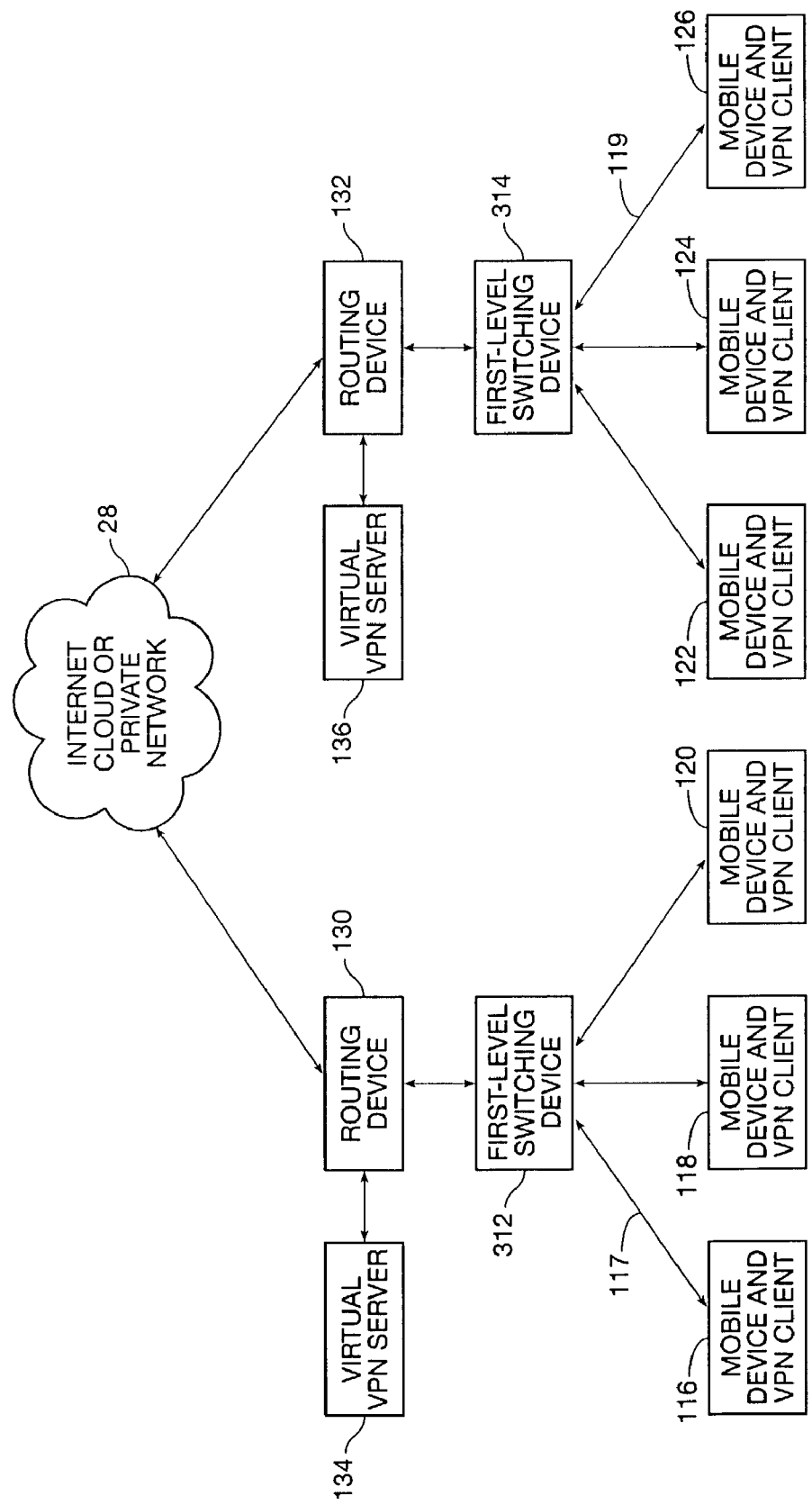
FIG. 3 is a block diagram showing a network according to the invention having mobile devices communicating with a plurality of physical VPN servers, each configured with the same virtual VPN server address, wherein the physical VPN servers are not at or near the edge of the network, but where they are separated from the edge of the network by ISO Layer 3 routing equipment.

Referring to FIG. 3, an alternative embodiment of the invention is shown. The mobile device 116 or 126 communicates through the access network 117 or 119 to a first level switching device 312 or 314 operating an ISO layer 2 and to at least one (potentially stackable) ISO layer 3 routing device 130 or 132 operating on ISO layer 3. The routing device 130 or 132 use ISO layer 3 networking protocols that include addressing information that informs other routing, bridging, and switching devices in the network how the communication from the mobile device 116 or 126 is to be routed to its intended destination.

In the embodiment of the invention shown in FIG. 3, the physical VPN servers 134 and 136 and as a consequence virtual VPN servers (not depictable) are removed from the edge of the network and located deeper in the core of the network. (VPN servers are considered to be removed from the edge of the network if layer 2 addressing alone is insufficient to allow a mobile device to communicate with the VPN server.) According to the invention, each of the physical VPN servers 134 and 136 is assigned the same network (layer 3) address, namely the layer 3 address of the virtual VPN server, and every mobile device is configured to communicate with this virtual VPN server at the layer 3 address serviced by its associated physical VPN server. Of course there can also be multiple virtual VPN servers residing on and sharing the physical VPN servers. Each of the virtual VPN servers is also assigned a single layer 2 (MAC) address that is unique to its associated physical VPN server. Hence, the plurality of virtual VPN servers can resolve to a common physical VPN server layer 2 (MAC) address. It is to be appreciated that this represents a subtle and effective departure from the conventional wisdom of network address resolution.

In the network of FIG. 3, the mobile devices 116 and 126 (for example) are not able to directly resolve the network (layer 3) address of the virtual VPN server to a unique layer 2 (MAC) address. Instead the mobile devices 116 and 126 must rely on intermediary layer 3 network routing devices 130 and 132 to route the communication between the two mobile devices 116 and 126 and between their associated virtual VPN servers 134 and 136. The behavior of each mobile device is the same in this embodiment as those in FIG. 2.

Figure 5:
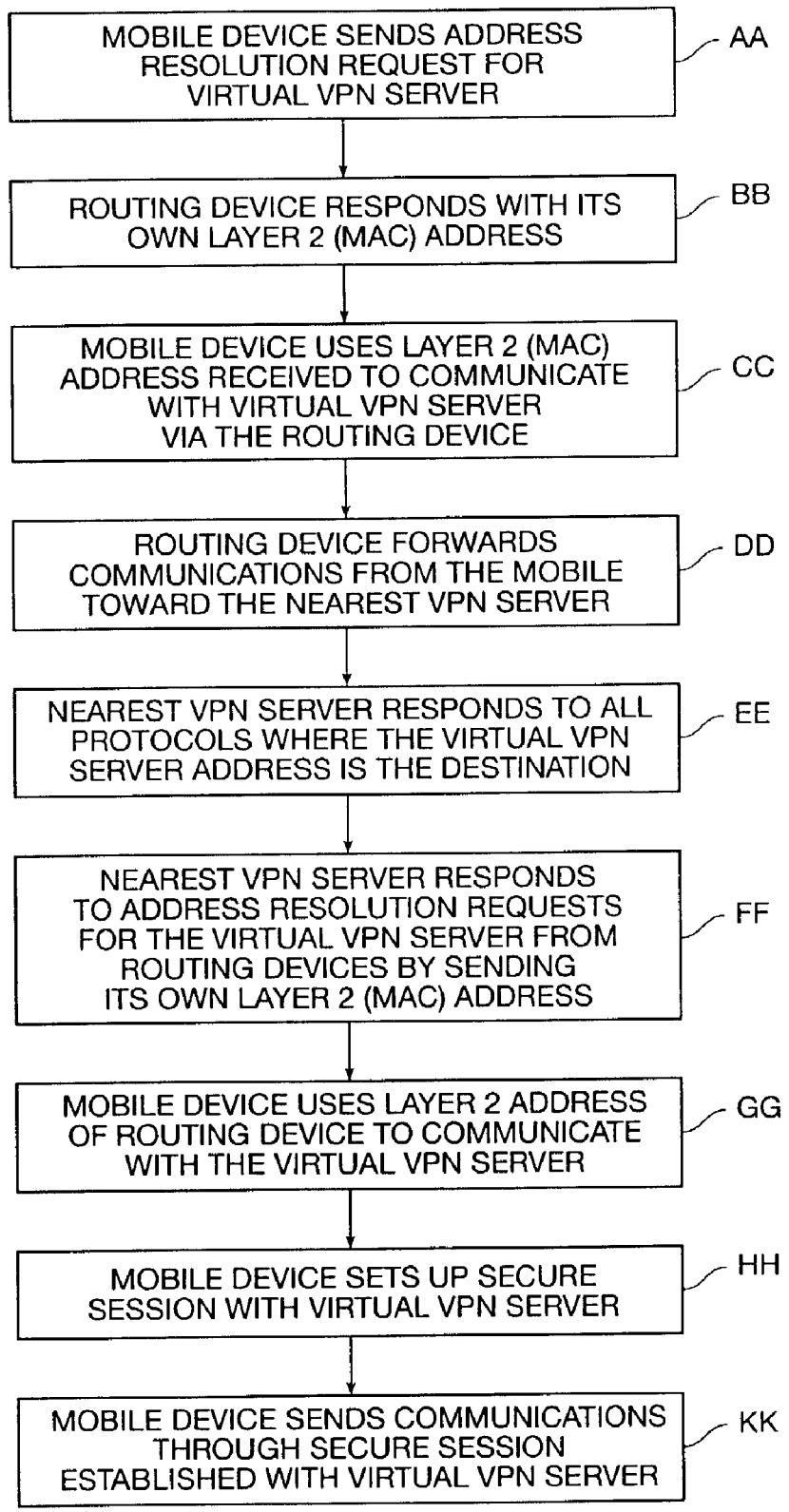

Referring to the flow chart of FIG. 5 in connection with FIG. 3, the mobile device 116 attempts to resolve the network (layer 3) address of the virtual VPN server to a layer 2 (MAC) address. In the embodiment of FIG. 3, an address resolution request is issued from the mobile device 116 (STEP AA). The mobile device 116 either sends an address resolution request for the layer 3 address of the virtual VPN server or the mobile device 116 will have been configured with a default layer 3 gateway address that is the address of the routing device 130 and thus sends an ARP request for a default gateway address. According to the well known material of current layer 3 protocol implementations, the mobile device 116 will use the default layer 3 gateway address as the address to which it sends any communications with destination addresses that are determined not to be directly accessible on the connected access network using layer 2 addressing alone. The intermediary routing device 130 responds to the address resolution protocol request(s) from the mobile device 116 (STEP BB). In particular, the routing device 130 responds to the address resolution request of the mobile device 116 for the layer two address of either the virtual VPN server layer 3 address or the default layer 3 gateway address by providing its own layer 2 address to the mobile device 116 as the address to which the mobile device is to send it communications for the virtual VPN server. The mobile device 116 uses the layer 2 address sent by the routing device 130 to communicate with the virtual VPN server (STEP CC). The intermediary routing device then forwards the communication from the mobile device on toward the virtual VPN server (STEP DD). Because the network address of the virtual VPN server is not unique in the network and is shared by all the other VPN servers, the intermediary networking devices 130, 132 must be configured with specific routing information (superseding general routing rules) relating to the layer 3 network address of the virtual VPN server specifying how to forward communications to the nearest physical VPN server 134, 136 that supports a virtual VPN server.

In the embodiment of FIG. 3, a virtual VPN server 134 or 136 that is removed from the edge of the network responds to all configured protocols where the specific virtual VPN server layer 3 address is the intended destination of the protocol communication (STEP EE). In particular, when a request to resolve the virtual VPN server layer 3 address is received, the virtual VPN server 134 to which the communications from the mobile device 116 are to be sent responds to requests to resolve layer 3 addresses to layer 2 addresses by sending the unique layer 2 address of the physical VPN server (STEP FF). The physical VPN servers 134, 136 respond to address resolution requests from the intermediary routing devices 130, 132 that forward communications from the mobile devices. These physical VPN server responds to such address resolution requests for the virtual VPN server layer 3 address are in addition to any other responses that may be provided in response to requests for other layer 3 addresses which may be configured on the specific networking device. The mobile device 116 communicates further with the virtual VPN service of the physical VPN server 134 using the layer 2 address received from the intermediary routing device 130 in response to the address resolution request (STEP GG) to establish a secure communication session with the virtual VPN service (STEP HH). After establishment of the secure communication session with the virtual VPN service, the mobile device 116 sends its communications to the virtual VPN server using the secure communication session (STEP KK).

The invention has now been explained with reference to specific embodiments. Other embodiments will be apparent to those of ordinary skill in the art. Therefore this invention is not to be limited, except as indicated by the appended claims.

What is claimed is:

1. A data communication network having at least one Virtual Private Network comprising:
    a plurality of physical Virtual Private Network servers sharing a single common layer 3 network address corresponding to a virtual Virtual Private Network server; and
    a plurality of Virtual Private Network client devices configured to associate with said single common layer 3 network address of said virtual Virtual Private Network server, wherein each physical Virtual Private Network server is operative to resolve the single common layer 3 network address of the virtual Virtual Private Network server directly to a layer 2 MAC address unique to itself as said physical Virtual Private Network server in order to enable communications on physical connections between said Virtual Private Network client devices and said physical Virtual Private Network server.

2. The network of claim 1 wherein a plurality of virtual Virtual Private Network servers is associated with each said physical Virtual Private Network server.

3. The network of claim 1 further including:
at least one layer 3 network routing device, said routing device physically separating each said physical Virtual Private Network server from said Virtual Private Network client devices.

4. The network of claim 3 wherein a plurality of Virtual Private Network servers is associated with each said physical Virtual Private Network server.

5. A method for distributing Virtual Private Network services among a plurality of individual physical Virtual Private Network servers comprising:
sharing a common layer 3 network address of a virtual Virtual Private Network server with each one of a plurality of physical Virtual Private Network servers; and
physically connecting Virtual Private Network client devices to selected ones of said plurality of physical Virtual Private Network servers;
configuring said Virtual Private Network client devices to access said physical Virtual Private Network servers through said common layer 3 network address of said virtual VIrtual Private Network server; and
at each said physical Virtual Private Network server, in response to an address resolution request, resolving said common layer 3 network address to a layer 2 MAC address unique to said physical Virtual Private Network server.

6. A method for distributing Virtual Private Network services among a plurality of individual physical Virtual Private Network Servers comprising:
sharing a common layer 3 network address of a virtual Virtual Private Network server with each one of a plurality of physical Virtual Private Network servers; and
physically connecting Virtual Private Network client devices to selected ones of said plurality of physical Virtual Private Network servers via at least one intermediate routing device;
configuring each said routing device to resolve said common layer 3 network address of said virtual Virtual Private Network server to access one of said physical Virtual Private Network servers which is associated with said routing device for routing traffic between said Virtual Private Network client devices and said associated physical Virtual Private Network server;
configuring said Virtual Private Network client devices to access said physical Virtual Private Network servers through said common layer 3 network address of said virtual Virtual Private Network server; and
at each said physical Virtual Private Network server, in response to an address resolution request, resolving said common layer 3 network address to a layer 2 MAC address unique to said physical Virtual Private Network server.

7. A system comprising:
a first physical Virtual Private Network server, wherein the first physical Virtual Private Network server shares a common layer 3 network address of a virtual Virtual Private Network server with at least a second physical Virtual Private Network server and
wherein the first physical Virtual Private Network server is operable to resolve the address of the virtual Virtual Private Network server directly to a layer 2 MAC address unique to the first physical Virtual Private Network server to enable communications on physical connections with a Virtual Private Network client device configured to associate with the address of the virtual Virtual Private Network server.

8. A method, comprising:
sharing an address of a virtual Virtual Private Network server between a first and second physical Virtual Private Network servers, wherein the address is a single common layer 3 network address; and
resolving the address of the virtual Virtual Private Network server directly to a layer 2 MAC address unique to the first physical Virtual Private Network server to enable communications on physical communications with a Virtual Private Network client device, wherein the client device is configured to associate with the address of the virtual Virtual Private Network server.

* * * * *